United States Patent [19]
Eith et al.

[11] Patent Number: 5,735,582
[45] Date of Patent: Apr. 7, 1998

[54] ELECTROMAGNETICALLY CONTROLLABLE VALVE ARRANGEMENT

[75] Inventors: Hubert Eith; Helmut Staib, both of Schwieberdingen; Michael Friedow, Tamm; Martin Scheffel, Vaihingen/Enz; Jurgen Lander, Stuttgart; Gerhard Stokmaier, Markgrningen; Hans-Friedrich Schwarz, Muhlacker, all of Germany

[73] Assignee: Robert Bosch GmbH, Stuttgart, Germany

[21] Appl. No.: 682,598

[22] PCT Filed: Nov. 11, 1995

[86] PCT No.: PCT/DE95/01561
  § 371 Date: Aug. 16, 1996
  § 102(e) Date: Aug. 16, 1996

[87] PCT Pub. No.: WO96/15926
  PCT Pub. Date: May 30, 1996

[30] Foreign Application Priority Data

Nov. 24, 1994 [DE] Germany ............ 44 41 791.8
Sep. 9, 1995 [DE] Germany ............ 195 33 400.0

[51] Int. Cl.$^6$ .................................................. B60T 8/36
[52] U.S. Cl. ............................... 303/119.2; 137/596.17
[58] Field of Search ....................... 303/119.2, 119.1, 303/116.1, 116.2; 137/627.5, 596.17

[56] References Cited

FOREIGN PATENT DOCUMENTS 418602   3/1991   European Pat. Off. .
1168725  7/1964   Netherlands .

Primary Examiner—Peter M. Poon
Attorney, Agent, or Firm—Edwin E. Greigg; Ronald E. Greigg

[57] ABSTRACT

A valve assembly with a housing, a master valve and an auxiliary valve and an armature for the auxiliary valve and an electromagnet is proposed. In previous valve assemblies, in which the auxiliary valve, openable via the armature, serves to open the master valve, a master valve closing element is coupled via an idle stroke arrangement to the armature of the auxiliary valve closing element. If the armature traverses a first partial stroke, then the auxiliary valve is opened; if the armature traverses a further partial stroke, then via the idle stroke arrangement it can lift the master valve closing element from a master valve seat, if hydraulic forces are slight enough. Instead of the idle stroke arrangement, the master valve closing element is given its own armature, which is rigidly joined to the master valve closing element and acts in the opening direction. The valve assembly of the invention can advantageously be used in hydraulic vehicle brake systems that are set up for automatic braking. The smallness and the simplicity, thanks to the solid connection of the master valve closing element to its own armature, are advantageous.

12 Claims, 6 Drawing Sheets

ELECTROMAGNETICALLY CONTROLLABLE VALVE ARRANGEMENT

BACKGROUND OF THE INVENTION

Prior Art

The invention is based on an electromagnetically controllable valve arrangement. From German Published Patent Disclosure DE 42 31 740 A1, a hydraulic anti-lock vehicle brake system is disclosed that is supplemented with a traction control system for four driven wheels and for the accelerated application of brake shoes at the onset of a traction control mode. Brake pressure for the traction control is furnished by self-aspirating return pumps that are part of the anti-lock system and that aspirate pressure fluid from a master cylinder through electromagnetically openable 2/2-way valves, which have relatively large admission cross sections. Two auxiliary pumps are provided to speed up the application of the brake shoes.

German Patent DE 42 32 311 C1 discloses a hydraulic vehicle brake system that while using an anti-lock system is expanded for side-slip traction control of vehicle wheels when cornering, by automatic braking.

In hydraulics in general, valve arrangements are known that comprise a master valve and an auxiliary valve used for hydraulic control of the master valve.

One such valve arrangement, described by German Patent DE 28 20 911 C2, substantially comprises a housing, a master valve with a master valve seat and a master valve closing element, and an auxiliary valve with an auxiliary valve seat on the master valve closing element and a control opening, beginning at and passing through the auxiliary valve seat, and having an auxiliary valve closing element as well as a spring that loads the auxiliary valve closing element; it also has a movable armature for moving the auxiliary valve closing element away from the auxiliary valve seat and thus away from the master valve closing element and has a further movable element that is movable relative to the armature and is magnetically operative. A disadvantage of this valve arrangement is that a diaphragm extends between the master valve closing element and the housing and is threatened upon hydraulic impingement with high pressure, and also that when the master valve is opened the master valve closing element has to displace the armature arrangement that comprises the armature and the further movable element. However, since the displacement force depends on a pressure difference between the two sides of the diaphragm, and because such a pressure difference lessens as the master valve opens, the master valve opens slowly.

OBJECTS AND SUMMARY OF THE INVENTION

Advantages of the Invention

It is a principal object of the valve arrangement according to the invention to provide the advantage that on the one hand the auxiliary valve closing element can be speeded up quickly for rapidly generating hydraulic auxiliary force for the opening of the master valve, and that from the time the master valve closing element opens this element can be speeded up by its armature, especially whenever the armature of the auxiliary valve closing element has already covered a certain stroke path. Because the valve arrangement of the invention is embodied such that the longest stroke path of an armature is the path intended for opening of the auxiliary valve, the associated electromagnet can be relatively small and light in weight and can easily be accommodated inside the anti-lock system.

By means of the provisions recited here in advantageous further features of and improvements to the valve arrangement are possible.

It is another object of the invention to produce an advantageous combination with a hydraulic vehicle brake system that can be arranged for automatic braking, for instance for the sake of controlling side slip traction of vehicle wheels by braking and/or for traction control of driven wheels by automatic braking.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
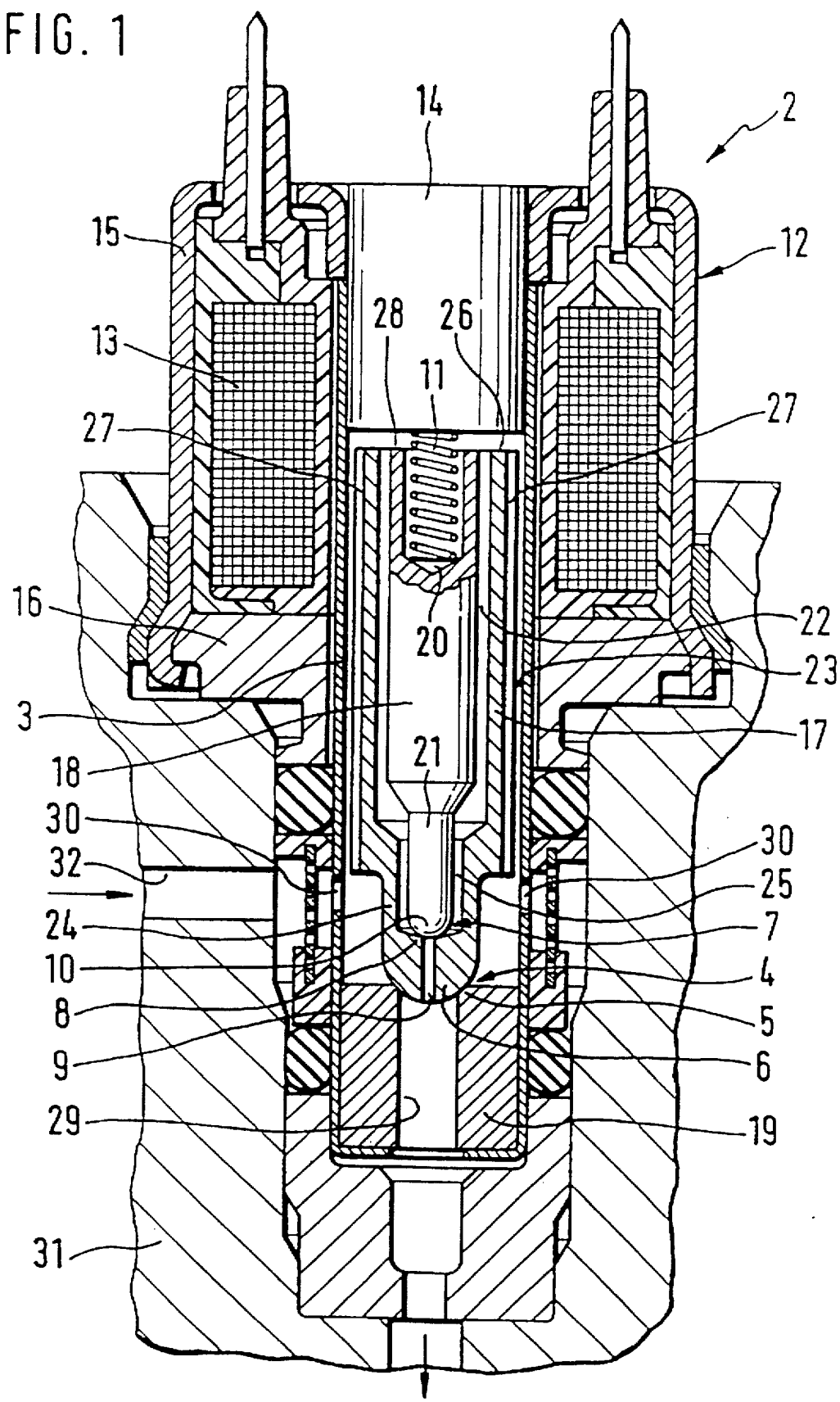
FIG. 1 is a longitudinal section of a first embodiment of the invention.

The valve assembly 2 of FIG. 1 has a housing 3, a master valve 4 with a master valve seat 5 and a master valve closing element 6, an auxiliary valve 7 with an auxiliary valve seat 8, with a control opening 9, with an auxiliary valve closing element 10, and with a spring 11 and an electromagnet 12 with a coil 13 and a pole core 14 that is stationary relative to the coil 13, with a magnetic flux conducting body 15 around the coil 13 and with a further magnetic flux conducting body 16, adjoining the magnetic flux conducting body 15 and leading to the housing 3, with an armature 17 and a further armature 18.

The coil 13, the pole core 14 and the magnetic flux conducting body 15 and 16 as well as the housing 3 are found in an electromagnetically actuatable valve as described by British Patent GB 2 263 741 A. Accordingly, it can be seen that the invention is also directed to making use of already created, time-tested components. It can also be seen from this that the invention is directed to making do with the amount of installation space that has been available in the past.

In a manner comparable to the known valve mentioned above, the master valve seat 5 is located in a valve seat body 19 that is retained in the tubular housing 3. On the other end of the tubular housing 3, as in the prior art, the pole core 14 is hydraulically tightly secured. As in the prior art, the spring 11 is supported on the pole core 14 and extends into a recess 20 that is made in the armature 18. The armature 18 is embodied cylindrically and is combined with a tappet 21 to which the auxiliary valve closing element 10 is connected. For instance, the armature 18, the tappet 21, and the auxiliary valve closing element 10 may be embodied integrally by being pressed in a die.

The armature 18 has a diameter that is less than the diameter of the pole core 14. The other armature 17 is embodied in the manner of a tube, so that it is capable of receiving the armature 18 while leaving a radial clearance 22, in other words an air gap. A further radial clearance 23 for a further air gap is located between the tubular armature 17 and the housing 3, and as a result the armature 17 is movable relative to the housing 3, and the armature 18 is movable relative to the armature 17.

The substantially tubular armature 17 is adjoined by a tubular transition 24 to which the master valve closing element 6 is solidly connected. The master valve closing element 6, the tubular transition 24, and the tubular armature 17 may also be made in one piece by pressing. A substantially annular chamber 25 that leads to the auxiliary valve seat 8 is located in the tubular transition 24, toward the tappet 21.

In the exemplary embodiment of FIG. 1, the armature 17 has an end face 26, which is embodied annularly and faces the pole core 14. Longitudinal grooves 27, for instance two in number, begin at this annular armature end face 27 and extend longitudinally of the armature 17, discharging in the region of the tubular transition 24. The armature 18 likewise has an armature end face 28, which corresponding to the round cross section of the armature 18 and because of the recess 20 is likewise embodied as a circular-annular face. FIG. 1 shows the valve assembly 2 in its basic position; that is, the position in which the master valve closing element 6 is seated on the master valve seat 5, and the auxiliary valve closing element 10 is seated on the auxiliary valve seat 8, because of a built-in tension of the spring 11 which is therefore a closing spring. In the state shown, the annular armature end faces 26 and 28 are located in one common reference plane, which is spaced apart from the pole core 14. This spacing or clearance is the structurally provided stroke for both the armature 17 and the armature 18. This spacing then also determines the stroke of the master valve closing element 6 relative to its master valve seat 5. However, it should be noted that there is no compulsory reason for placing both armature end faces 26 and 28 as described in one common reference plane for their outset positions.

The master valve seat 5 opens into an outlet 29 that leads out of the housing 3. Leading into the housing 3 is at least one inlet 30, in the form of at least one aperture in the housing 3, preferably at the level of the tubular transition 24 of the outer armature 17.

FUNCTION OF THE FIRST EXEMPLARY EMBODIMENT

As already described, in the basic position shown, the master valve seat 5 and the auxiliary valve seat 8 are closed. Consequently, pressure fluid carried through a housing block 31, which by way of example is a component of a vehicle brake system, through a conduit 32 to the inlet 30 can cause a pressure difference between the inlet 30 and the outlet 29. When used in the aforementioned motor vehicle brake system, the pressure difference may be zero or, it may attain 130 bar or more by the actuation of a brake pedal, for instance.

When the valve assembly 2 is to be opened so that further pressure fluid can flow into the inlet 30 and out through the outlet 29, the coil 13 is supplied with electric current; as a result, at least the armature 18 is attracted to the stationary pole core 14, and in the process the auxiliary valve closing element 10 is moved. If a pressure difference imposed between the inlet 30 and the outlet 29 is very great, then the armature 18 only will move and in the process, by lifting of the auxiliary valve closing element 10 from the auxiliary valve seat 8, opens the control opening 9. The result inside the annular chamber 25 and also between the armatures 18 and 17 is a pressure drop compared with a pressure that acts around the tubular transition 24 and axially upon the outer armature 17. This latter pressure acts upon a projected circular-annular face that is defined on the one hand substantially by the outer diameter of the armature 17 and on the other hand by the diameter of the auxiliary valve seat 5. As can be seen, the armature 17 is accordingly under a hydraulic load that is oriented toward the pole core 14 and accordingly can move the armature 17 and in so doing can lift the master valve closing element 6 from the master valve seat 5. Consequently, the master valve 4 can be opened by a change of pressure controllable by the auxiliary valve 7. It can be seen that the force required for the opening is available as a result of a pressure gradient between the inlet 30 and the outlet 29.

If the previously existing pressure difference decreases because of the opening of the master valve 4, then the force that acts in the opening direction of the master valve also becomes less. In a manner essential to the invention, the armature 17 compensates for a decrease in the hydraulic opening force, because this armature 17, like the armature 18, is attracted by the stationary pole core 14. Because both armatures 17 and 18 are simultaneously subject to attraction by the pole piece 14 from the time the electric current to the coil 13 is turned on, it can also be appreciated that the pole core 14 via the armature 17 reinforces the opening process of the master valve 4, or in other words can act to speed up the opening. This lends the advantage of short opening times.

As already noted, when the armatures 17 and 18 are in the outset position, their armature end faces 26 and 28, respectively, are located in the same plane, and the spacing from the pole core 14 is relatively short compared with a spacing of an armature disclosed in U.S. Pat. No. 4,082,116 to Stampfli. It can also be seen from this that the electromagnet 12 can be made relatively small.

Figure 2:
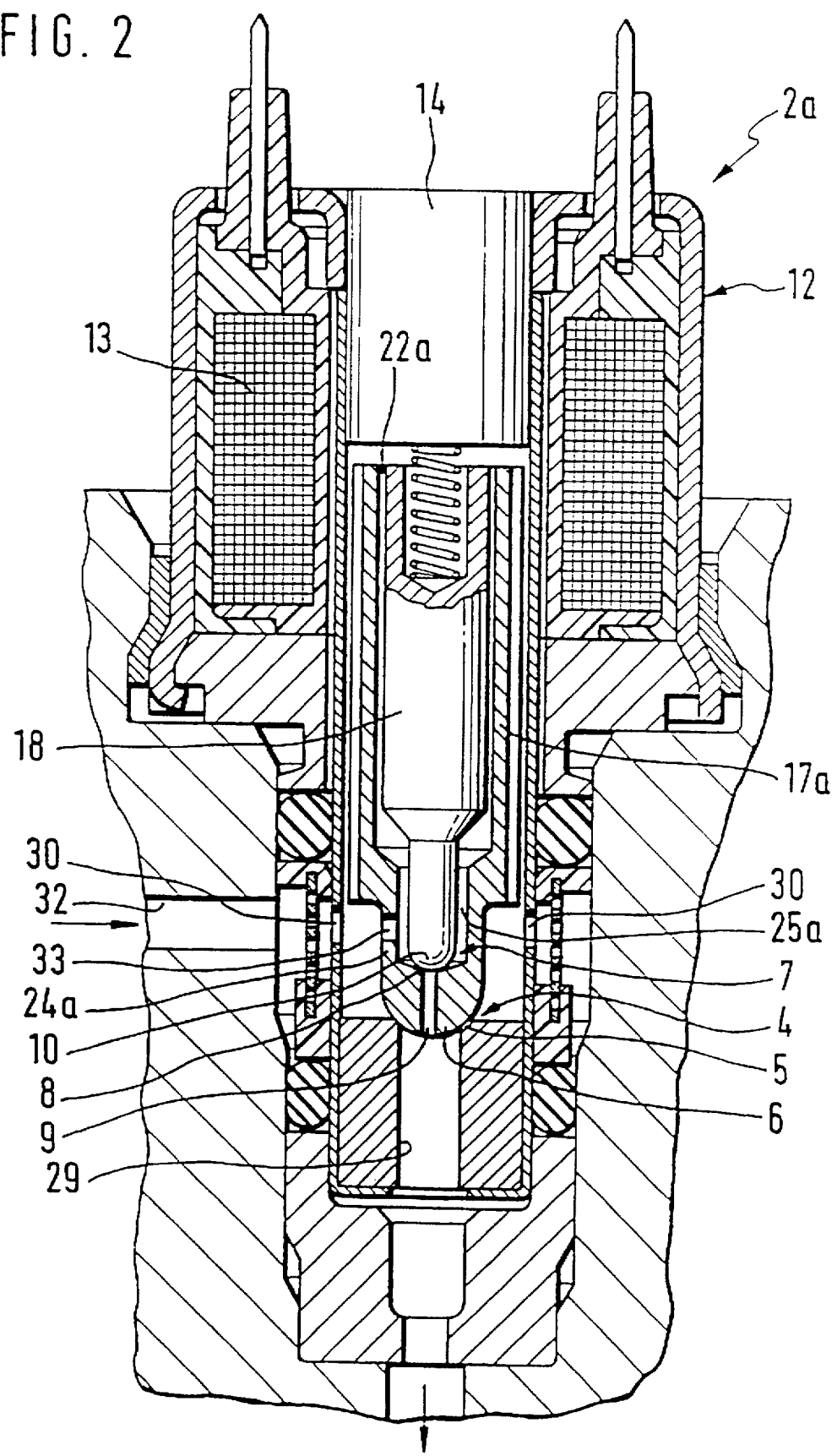
FIG. 2 is a longitudinal section of a second embodiment of the invention.

The valve assembly 2a of FIG. 2 differs from the valve arrangement 2 of FIG. 1 essentially in that a radial spacing or clearance 22a between the outer armature 17a and the inner armature 18 is selected to be smaller than in the valve assembly 2 of FIG. 1. Another difference is that now a chamber 25a located in a tubular transition 24a can be supplied with pressure fluid through at least one conduit 33, which penetrates the wall of the tubular transition 24a substantially in the radial direction. By way of example, only one conduit 33 is provided, whose diameter is essentially equivalent to a diameter of the control opening 9 but may also be larger or smaller in diameter. From the differences discussed, it can be seen that the chamber 25 communicates with the inlet 30 primarily through the conduit 33 and only secondarily through an annular gap corresponding to the radial spacing 22a.

MODE OF OPERATION OF THE SECOND EXEMPLARY EMBODIMENT

In the closed state of the valve assembly 2a, once again a pressure gradient, which prevails between the inlet 30 and the outlet 29, acts upon both the auxiliary valve closing element 10 and the master valve closing element 6. If upon the actuation of an electric current for the coil 13 the armature 18 is attracted to the pole core 14 and in the process the auxiliary valve closing element 10 is raised from the auxiliary valve seat 8, then inside the chamber 25a the pressure originally present drops, because of the outflow of pressure fluid through the control opening 9 and the throttled supply of pressure fluid through the conduit 33. Consequently, as in the exemplary embodiment of FIG. 1, the armature 17a is exposed for hydraulic reasons to a displacing force, which acts in the direction toward the pole core 14, so that it is moved toward the pole core 14 and in the process lifts the master valve closing element 6 from the master valve seat 5. Here, as described for the first exemplary embodiment, the pole core 14 has an attracting action upon the armature 17a, so that once again the process of opening of the master valve 4 is reinforced and thus speeded up and made shorter.

The ratio of the area between the cross section of the master valve seat 5 and the cross section of the auxiliary valve seat 8 can be chosen by the engineer. For the greatest pressure gradient between the inlet 30 and the outlet 29 to be expected, the cross section of the armature 17 of the first exemplary embodiment or of the armature 17a of the second exemplary embodiment should be chosen such that the applicable armature is capable of lifting the auxiliary valve closing element 10 from its auxiliary valve seat 8. Then a radial clearance between the armature 17 and the housing 3 can be utilized for the armature 17 or 17a. On the other hand, if the point of departure is a choice of cross section as shown in FIG. 2, then the maximum allowable cross section and thus the maximum allowable diameter of the auxiliary valve seat 8 thus are determined by the force that can be generated thereby by means of the electromagnet 12 and the armature 18.

The third exemplary embodiment of the valve assembly 2b of the invention, shown in FIG. 3, again has a master valve 4 and an auxiliary valve 7. An armature 18a associated with the auxiliary valve 7 has a first longitudinal portion 35, at the pole core 14, with a diameter that is nearly as large as the diameter of the pole core 14. In the direction toward the auxiliary valve closing element 10, the first longitudinal portion 35 is adjoined by a second longitudinal portion 36. The diameter of this longitudinal portion 36 is chosen to be smaller than the diameter of the armature 17a of the exemplary embodiment of FIG. 2. The second longitudinal portion 36 is likewise adjoined by a tappet 21, which terminates at the auxiliary valve closing element 10.

Similarly to the exemplary embodiments of FIGS. 1 and 2, a substantially tubular armature 17b is disposed around the armature 18a. This armature 17b is shorter than the armatures 17 and 17a of the exemplary embodiments of FIGS. 1 and 2, respectively, because it terminates below the first longitudinal portion 35 of the armature 18a. In the basic position as, shown, of the valve assembly 2b the master valve 4 and the auxiliary valve 7 are closed, and a small clearance remains for an air gap between the first longitudinal portion 35 of the armature 18a and an upper end face 37 of the armature 17b. The armature 17b likewise changes into or merges with a tubular transition 24. The tubular transition 24, as in the example of FIG. 2, is penetrated by at least one conduit 33. Once again, an annular chamber 25, defined by the tappet 21 and the auxiliary valve closing element 10, is located inside the tubular transition 24. The armature 17b can likewise have at least one longitudinal groove 27a. Correspondingly, the first longitudinal portion 35 of the armature 18a may also be provided with at least one longitudinal groove 27b. The longitudinal groove 27b decreases the resistance to motion of the armature 18a, which is surrounded by pressure fluid, and thus shortens the opening time of the auxiliary valve 7.

Figure 3:
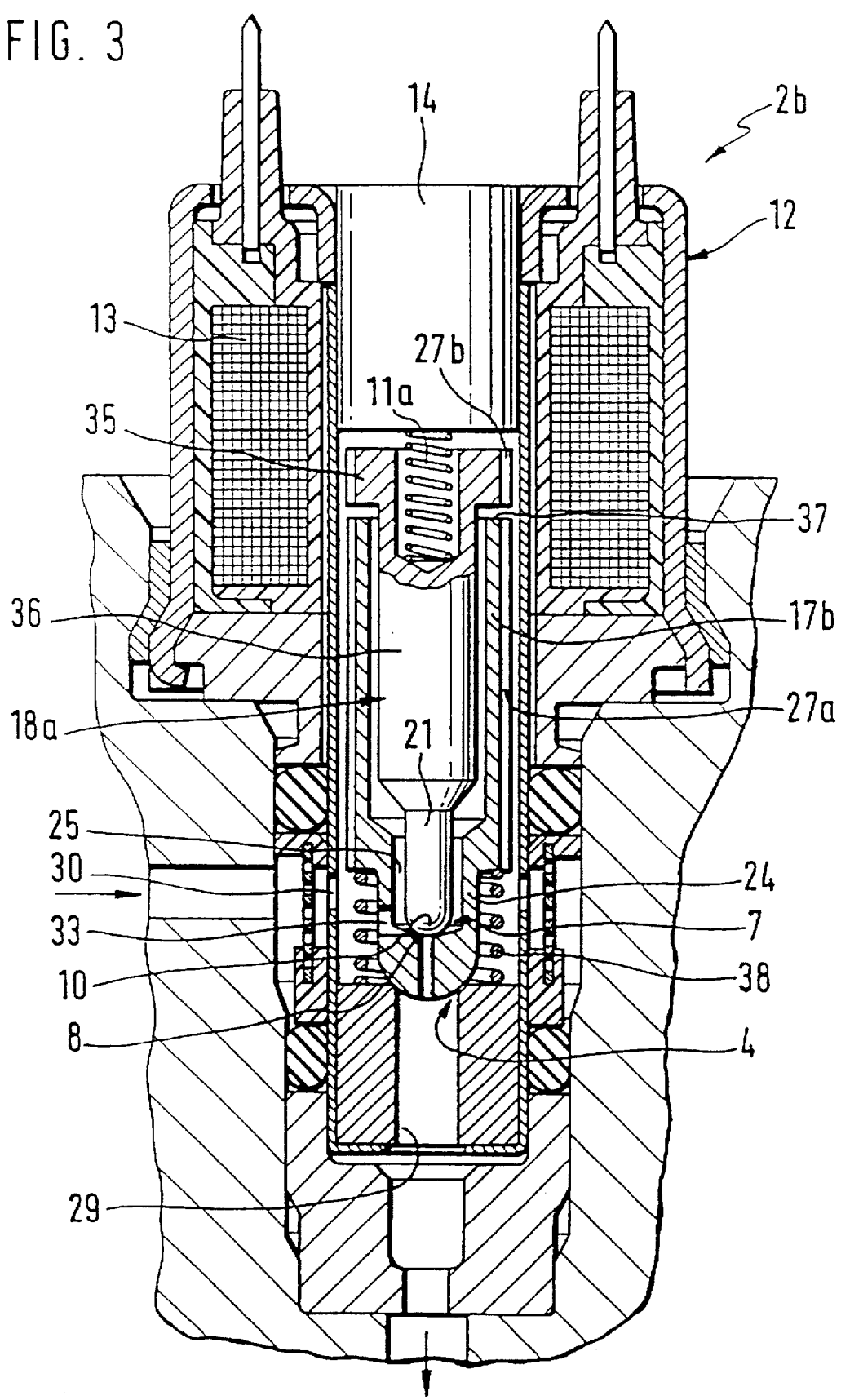
FIG. 3 is a longitudinal section of a third embodiment of the invention.

As already mentioned, the position shown in FIG. 3 is the basic position, in which the coil 13 is without current. If the coil 13 is acted upon by electric current to open the valve assembly 2b, then among other results the pole core 14 is flooded, and the first longitudinal portion 35 of the armature 18 is also primarily flooded. Consequently, compared with the exemplary embodiments of FIGS. 1 and 2, the armature 18a has a greater lifting force for lifting the auxiliary valve closing element 10 from its auxiliary valve seat 8. Correspondingly, the valve assembly 2b is highly suitable, given a large pressure gradient between its inlet 30 and its outlet 29.

After the opening of the auxiliary valve seat 8, the armature 17 is moved as a consequence of hydraulically generated forces and also electromagnetic forces, and so the auxiliary valve 7 opens. Because as suggested in FIG. 3 the armature 17b is attracted less strongly by the pole core 14, it may be expedient to assign the master valve 4 an opening spring 38. To assure that the valve assembly 2b is securely closable despite this opening spring 38, a spring 11a, which is supported on the pole core 14 and acts counter to the armature 18a, is embodied as somewhat stronger than in the exemplary embodiments of FIGS. 1 and 2. The disposition of the opening spring 38 is expedient if operation of the valve assembly 2b involves very viscous pressure fluid, such as brake fluid, as can be expected for instance at temperatures below −20° C.

In addition it will be noted that the opening spring 38 can also be adopted for the exemplary embodiments of FIGS. 1 and 2. In that case, the springs 11 would then have to be replaced with the stronger springs 11a. On the other hand, it is possible in the exemplary embodiment of FIG. 3 as well to leave out the at least one conduit 33 and instead provide a somewhat increased radial clearance 22 between the armature 17b and 18a, as in the example of FIG. 1.

Figure 4:
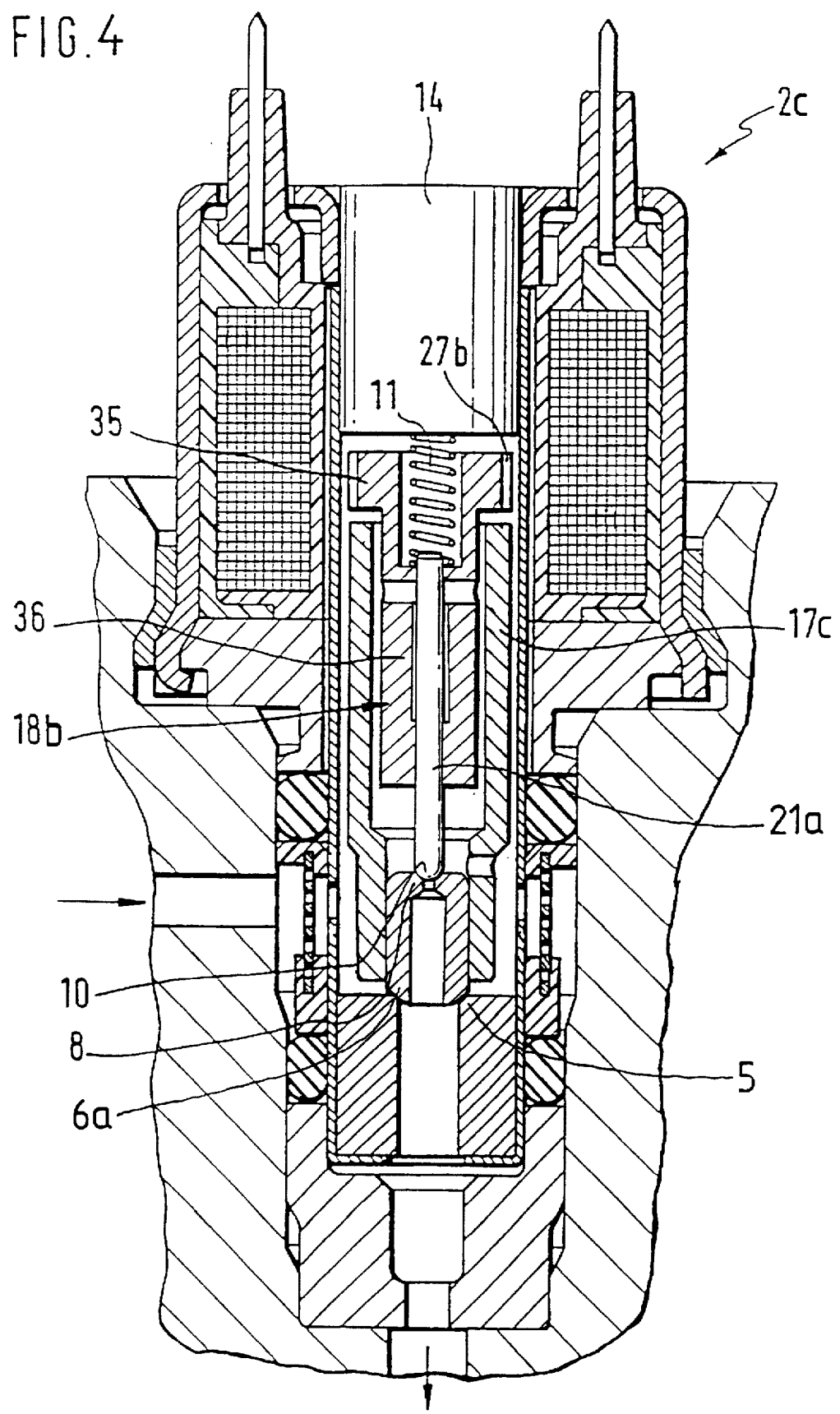
FIG. 4 is a longitudinal section of a fourth embodiment of the invention.

In the fourth exemplary embodiment of the valve assembly 2c of the invention, shown in FIG. 4, the armature 18b of the auxiliary valve closing element 10 is a stepped cylindrical component. It has a first longitudinal portion 35, which faces the pole core 14 and whose diameter is nearly as large as the diameter of the pole core 14. This first longitudinal portion 35 is adjoined integrally by a second longitudinal portion 36 of smaller diameter, which is received and guided in an armature 17c for a master valve closing element 6a. The first longitudinal portion 35 has at least one longitudinal groove 27b on its circumference. The armature 18b of the auxiliary valve closing element 10 comprises soft magnetic material. It has an axial bore that receives the spring 11 which presses the armature 18b away from the pole core 14. The axial bore continues with a smaller diameter through the armature 18b to the outside. A tappet 21a is press-fitted into it; the tappet protrudes out of the armature 18b in the direction of the auxiliary valve seat 8 and is shaped hemispherically on its end in the form of an auxiliary valve closing element 10. The tappet 21a is hardened, at least in the region of the auxiliary valve closing element 10. It may also be joined to the armature 18b in some other way than press-fitting, for instance being joined by welding or by indenting of the armature 18b radially on at least one point of its circumference.

The two-part embodiment of the armature 18b with the tappet 21a and the auxiliary valve closing element 10 is simpler to manufacture than a one-piece, i.e. integral, armature, and hence is more economical.

The armature 17c of the master valve closing element 6a is embodied as a tube, which tapers in diameter in the manner of a cuff in the direction of the master valve closing element 6a. The master valve closing element 6a is a cylindrical component with a continuous axial bore. On its face end toward the auxiliary valve closing element 10, a conical auxiliary valve seat 8 is embodied. The other face end of the master valve closing element 6a, oriented toward the master valve seat 5, is embodied spherically. The master valve closing element 6a is press-fitted into the armature 17c, but it may be joined to the armature 17c in some other manner known per se. It is hardened at least in the region of the auxiliary valve seat 8 and of its spherical end cooperating with the master valve seat 5. The armature 17c comprises soft magnetic material. This two-piece armature/closing element combination can also be embodied more simply and hence economically than a one-piece armature.

Otherwise, the fourth valve arrangement 2c matches the third embodiment shown in FIG. 3, with the opening spring 38 left out.

As the valve closing member, especially of the auxiliary valve 7 but also of the master valve 4, a ball may be used, which for instance in a manner known per se is press-fitted (not shown) into the armature 18, 17 on the face end toward the respective valve seat 5, 8. By using a ball, which is inexpensively available as a mass-produced part, as the closing element, it is possible to produce an armature and closing element simply and economically.

Figure 5:
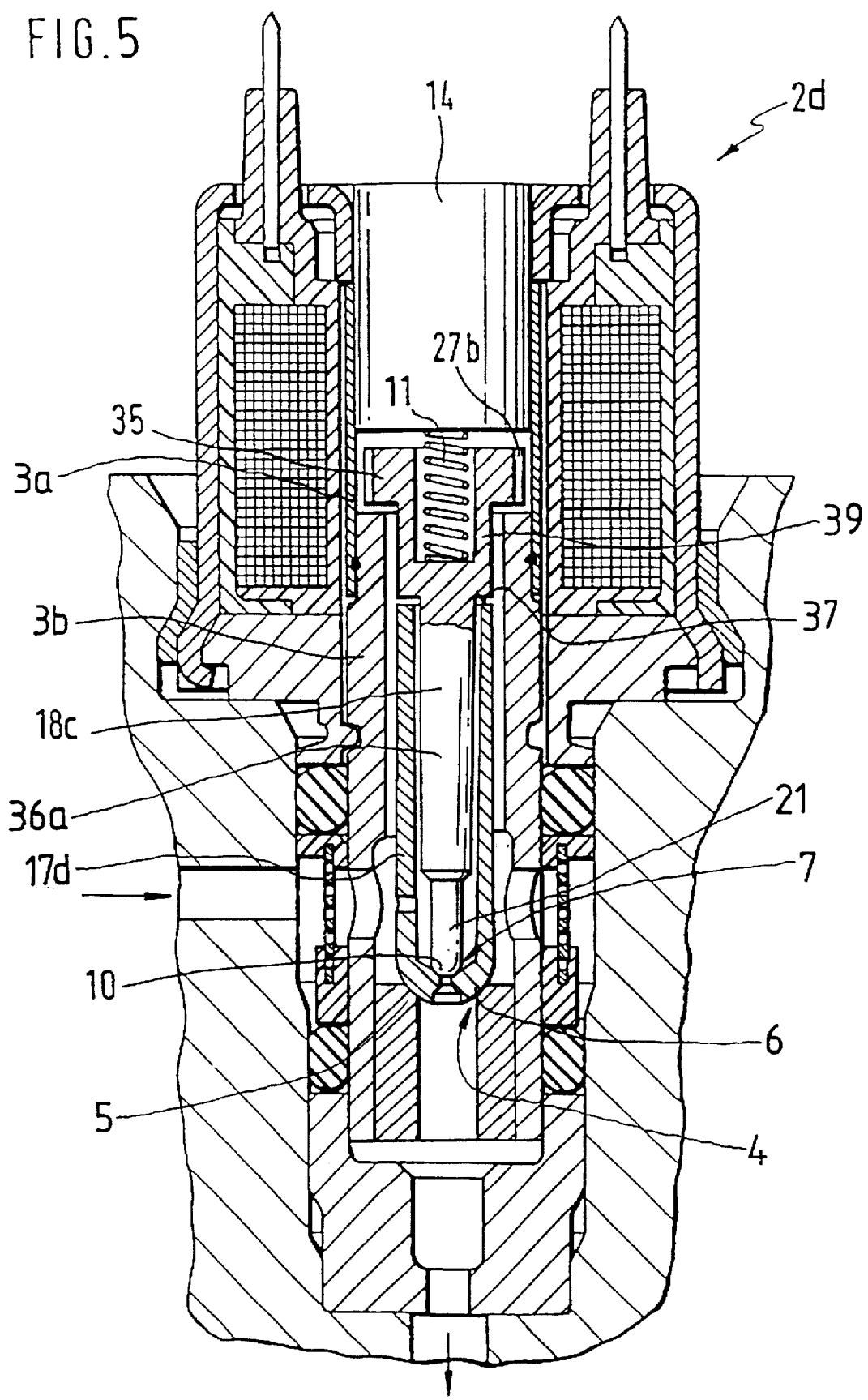
FIG. 5 is a longitudinal section of a fifth embodiment of the invention.

In the fifth valve assembly 2d of the invention, shown in FIG. 5, the housing has a shorter tubular portion 3a, which like the housing 3 of the previous embodiments of the invention have thin walls and is hydraulically tightly joined to the pole core 14. The tubular portion 3a continues in the form of a thick-walled tube 3b, with which it is hydraulically tightly joined, for instance by means of an encompassing weld. The inside diameter of the housing 3a, 3b tapers as a result on a face end of the thick-walled tube 3b toward the pole core 14. An armature 18c for the auxiliary valve closing element 10 is embodied as stepped in two places. It has a first longitudinal portion 35, facing toward the pole core 14, and at least one longitudinal groove 27b on its circumference.

With a short intermediate portion 39, the armature 18c protrudes into the tube 3b and is guided there. A further longitudinal portion 36a merges integrally with a tappet 21, whose free end forms the hemispherical auxiliary valve closing element 10. The further longitudinal portion 36a is received and guided in a tubular armature 17d of the master valve closing element 6.

The tubular armature 17d is embodied similarly to the armature 17b used in the third exemplary embodiment, but it has a smaller outside diameter, which is adapted to the tapered inside diameter of the tube 3b of the housing. The face end of the armature 17d toward the master valve seat 5 is embodied hemispherically as a master valve closing element 6. In this embodiment of the invention, the end face 37 of the armature 17d of the master valve closing element 6 is smaller than in the third valve assembly 2b, and as a result the magnetic force on the armature 18c of the auxiliary valve closing element 10 is greater, so that the actuation force for the auxiliary valve 7 is increased and the opening times are shortened. Since the master valve 4, as described above, opens with pressure fluid reinforcement, this is sufficient for a reduced actuation force. The magnetic circuit of the valve arrangement 2d is accordingly optimized with respect to the actuation of the auxiliary valve 7.

Figure 6:
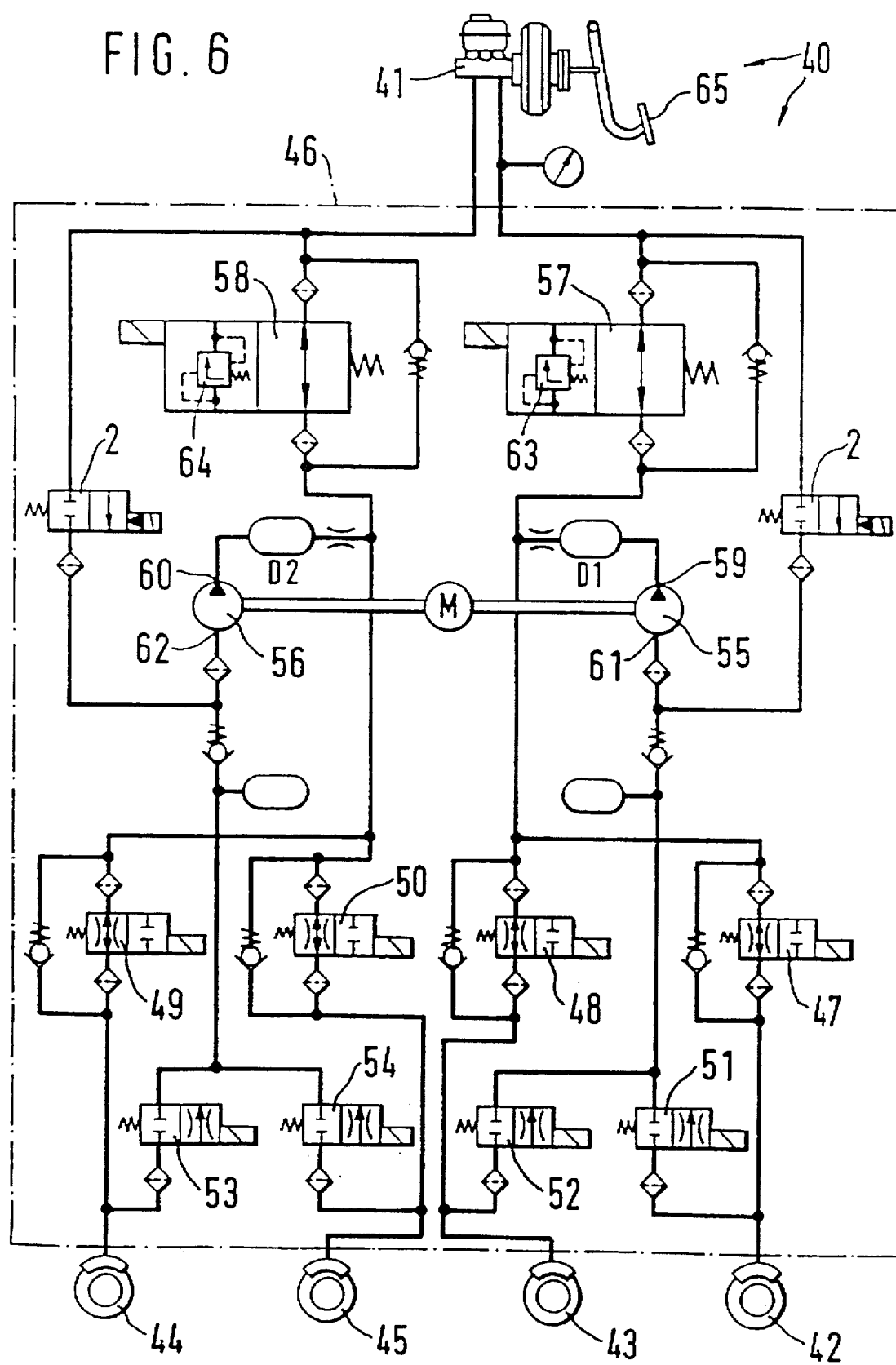
FIG. 6 is the circuit diagram of a hydraulic vehicle brake system into which the valve arrangement of the invention is incorporated.

The valve assemblies 2, 2a, 2b, 2c and 2d described are advantageously usable within a hydraulic vehicle brake system 40 as in FIG. 6. This hydraulic vehicle brake system 40 has an anti-lock system 46 of the so-called return feed type between a master cylinder 41 and four wheel brakes 42, 43, 44, 45. The wheel brakes 42, 43, 44, 45 are assigned brake pressure modulation valves 47, 48, 49, 50 and 51, 52, 53, 54. The brake pressure modulation valves 47–50 are embodied as normally open 2/2-way valves, and they carry pressure fluid, forced out of the master cylinder 41, to the wheel brake 42, 43, 44, 45. The brake pressure modulation valves 51, 52, 53, 54 are closed in their normal positions and are embodied as 2/2-way valves. These valves act as brake pressure reduction valves and are actuated as needed after the closing of a respectively associated brake pressure modulation valve 47 or 48 or 49 or 50. The brake pressure modulation valves 51–54 accordingly serve to drain pressure fluid from a respective wheel brake 42, 43, 44, 45 and carry it to a respective return pump 55 or 56. Each return pump 55, 56 pumps the pressure fluid supplied to it to upstream of the brake pressure modulation valves 47, 48; 49, 50, respectively, increasing its pressure in the process, and in the case where the anti-lock mode ensues, each return pump also pumps it back to the master brake cylinder 41.

The anti-lock brake system is expanded for automatic braking by the incorporation of reversing valves 57 and 58 between the master cylinder 41 and the brake pressure modulation valves 47, 48, 49, 50 as well as the respective outlets 59 and 60 of the return pumps 55 and 56. In addition, between the inlets 61 and 62 of the return pumps 55 and 56, respectively, and the master cylinder 41, there is one valve assembly 2, 2a or 2b each of the type described. The reversing valves 57 and 58 are combined with safety valves 63 and 64. Because of the disposition of the reversing valves 57, 58, that is, the safety valve 63, 64, automatic braking becomes possible without requiring that a driver actuate a brake pedal 65 associated with the master cylinder 41. As already noted at the outset, the automatic braking can be done for instance for the sake of side-slip traction control of vehicle wheels, the purpose being that by automatic braking lateral wheel slip is increased until it becomes at least approximately equal to the undesirably great wheel slip of the vehicle wheel moving in front of or behind it, in order to reduce the tendency to spinning or to terminate spinning. This expanded anti-lock brake system 46 is naturally also, as already noted in the background section, suitable for regulating undesirably high drive slip in driven wheels to lesser slip values by automatic braking.

It is also noted that the valve assemblies 2, 2a, 2b, 2c and 2d of the invention can also be advantageously employed in systems other than the vehicle brake system 40 shown in FIG. 6. Since anti-lock brake systems, traction control systems, and embodiments for side-slip traction control are already part of the prior art, they need not be discussed here in terms of all the details of their operation. It will merely be stated therefore that whenever the brake pedal 65 is not actuated, whichever of the valve assemblies 2, 2a, 2b, 2c or 2d is used can be opened fast, since practically no pressure gradient that hinders the opening is present between the master cylinder 41 and the respective inlet 61 or 62 of the return pumps 55 or 56. In such cases, the electromagnet 12 will move both armatures 17, 18, or 17a, 17b and 18a, simultaneously; as a result, the master valve seat 5 is opened very quickly, and the return pumps 55 and 56, which are embodied as self-aspirating pumps, fill up well and accordingly can generate rapid pressure rises at their outlets 59 and 60.

If a side-slip traction control mode is necessary while the brake pedal 65 is depressed, causing a brake pressure to prevail upstream of the valve arrangements 2, then the applicable electromagnet 12 will first attract only the armature 18 or 18a of the applicable auxiliary valve 7 and open that auxiliary valve 7; after that, in the manner already described, by hydraulic action but also with reinforcement of the applicable electromagnet 12, the respective master valve 14 is opened. From the time that the respective master valve 4 has opened, the entire cross section of the applicable master valve 4 is then again available for supplying the respective self-aspirating return pump 55 or 56.

Since as already noted anti-lock brake systems and further features of them are known in the prior art, and because various embodiments of them already exist, it will merely be pointed out here in general that the valve assemblies 2, 2a, 2b, 2c and 2d of the invention can also be used in other brake systems than the hydraulic vehicle brake system 40 described only briefly here.

The foregoing relates to preferred exemplary embodiments of the invention, it being understood that other variants and embodiments thereof are possible within the spirit and scope of the invention, the latter being defined by the appended claims.

What is claimed and desired to be secured by letters patent of the United States is:

1. A valve assembly, comprising a housing, a master valve having a master valve seat and a master valve closing element, an auxiliary valve having an auxiliary valve seat and an auxiliary valve closing element, a control opening originating at the auxiliary valve seat and passing through the master valve closing element, a spring pre-loading the auxiliary valve closing element to a closed position, a first movable magnetically operative armature for moving the auxiliary valve closing element away from the auxiliary valve seat under influence of an electromagnet, said assembly having a second movable magnetically operative armature which is freely movable relative to the first magnetically operative movable armature of the auxiliary valve closing element, the second movable magnetically operative armature (17, 17a, 17b, 17c, 17d) is disposed so as to surround the first movable armature (18, 18a, 18b, 18c) of the auxiliary valve closing element (10) over at least a portion of its length, said second magnetically operative armature being rigidly joined to the master valve closing element (6) and the first and second armatures (17, 17a, 17b, 17c, 17d, 18, 18a, 18b, 18c) are provided a single pole core (14) which is disposed immovably in the electromagnet (12).

2. The valve assembly as defined by claim 1, in which the first armature (18) of the auxiliary valve closing element (10) is capable of being received substantially over its entire length into a substantially tubularly embodied second armature (17, 17a) of the master valve closing element (e).

3. The valve arrangement as defined by claim 1, in which the master valve closing element (6) and the second armature (17, 17a, 17b) are joined together via a tubular, transition (24), the transition (24) is embodied hydraulically tightly, and a gap located between the first and second armatures (17, 17a, 17b, 18, 18a) forms a flow conduit leading into the tubular transition (24).

4. The valve assembly as defined by claim 1, in which the master valve closing element (6) and the second armature (17a, 17b) are joined together via a tubular transition (24), and the tubular transition (24) is penetrated by at least one conduit (33).

5. The valve assembly as defined by claim 4, in which the at least one conduit (33) has a diameter substantially equivalent to the diameter of a further control conduit (9) adjoining the auxiliary valve seat (8).

6. The valve assembly as defined by claim 1, in which at least one longitudinal groove (27) is machined axially along a peripheral face of the second armature (17, 17a, 17b) of the master valve closing element (6).

7. The valve assembly as defined by claim 1, in which the auxiliary valve closing element is a ball.

8. The valve assembly as defined by claim 1, in which the master valve closing element is a ball.

9. The valve assembly as defined by claim 1, in which the valve assembly is a component of a hydraulic vehicle brake system (40) having a master cylinder (41), wheel brakes (42, 43, 44, 45) with brake pressure modulation valves (47 48, 49, 50, 51, 52, 53, 54), and having at least one self-aspirating return pump (55, 56) that supplies brake fluid by means of the valve assembly (2, 2a, 2b).

10. A valve assembly, comprising a housing, a master valve having a master valve seat and a master valve closing element, an auxiliary valve having an auxiliary valve seat and an auxiliary valve closing element, a control opening originating at the auxiliary valve seat and passing through the master valve closing element, a spring pre-loading the auxiliary valve closing element to a closed position, a first movable armature for moving the auxiliary valve closing element away from the auxiliary valve seat under influence of an electromagnet, said assembly having a second movable magnetically operative armature which is movable relative to the first movable armature of the auxiliary valve closing element and is magnetically operative, the second movable magnetically operative armature (17, 17a, 17b, 17c, 17d) is disposed so as to surround the first movable armature (18, 18a, 18b, 18c) of the auxiliary valve closing element (10) over at least a portion of its length, said second magnetically operative armature being rigidly joined to the master valve closing element (6) and the first and second magnetically movable armatures (17, 17a, 17b, 17c, 17d, 18, 18a, 18b, 18c) are provided a single pole core (14) which is disposed immovably in the electromagnet (12), said first magnetically operative armature (18a) of the auxiliary valve closing element (10) has a first longitudinal portion (35) adjacent the pole core (14), which portion has a diameter substantially equivalent to the diameter of the pole core (14) and adjoining the first longitudinal portion (35) has a second longitudinal portion (36) provided with a smaller diameter, and when the auxiliary valve (7) is closed, the substantially tubularly embodied second armature (17b) of the master valve closing element (6) has an axial minimum spacing of one face end (37) from the first longitudinal portion (35) of the first armature (18a) of the auxiliary valve closing element (10).

11. The valve assembly as defined by claim 10, in which a longitudinal groove (27b) is machined into the outer circumference of the first longitudinal portion (35) of the first armature (18a) of the auxiliary valve closing element (10).

12. A valve assembly, comprising a housing, a master valve having a master valve seat and a master valve closing element, an auxiliary valve having an auxiliary valve seat and an auxiliary valve closing element, a control opening originating at the auxiliary valve seat and passing through the master valve closing element, a spring pre-loading the auxiliary valve closing element to a closed position, a first movable armature for moving the auxiliary valve closing element away from the auxiliary valve seat under influence of an electromagnet, said assembly having a second movable magnetically operative armature which is movable relative to the first movable armature of the auxiliary valve closing element and is magnetically operative, the second movable magnetically operative armature (17, 17a, 17b, 17c, 17d) is disposed so as to surround the first movable armature (18, 18a, 18b, 18c) of the auxiliary valve closing element (10) over at least a portion of its length, said second magnetically operative armature being rigidly joined to the master valve closing element (6) and the first and second magnetically movable armatures (17, 17a, 17b, 17c, 17d, 18, 18a, 18b, 18c) are provided a single pole core (14) which is disposed immovably in the electromagnet (12), said second spring (38) is embodied as an opening spring for the master valve closing element (6) and is weaker than the first spring (11), which is a closing spring.

* * * * *